United States Patent [19]

Mäkimaa

[11] Patent Number: 4,533,817

[45] Date of Patent: Aug. 6, 1985

[54] METHOD FOR MEASURING THE FREE WIRE LENGTH IN MIG/MAG WELDING

[75] Inventor: Tapani Mäkimaa, Lahti, Finland

[73] Assignee: Kemppi Oy, Lahti, Finland

[21] Appl. No.: 556,909

[22] Filed: Dec. 1, 1983

[30] Foreign Application Priority Data

Dec. 29, 1982 [FI] Finland .................................. 824500

[51] Int. Cl.$^3$ ................................................ B23K 9/12
[52] U.S. Cl. ............................ 219/137.71; 219/137 PS
[58] Field of Search ...................... 219/137.71, 137 PS

[56] References Cited

U.S. PATENT DOCUMENTS 3,627,975 12/1971 Goto ............................... 219/137.71
3,731,049 5/1973 Kiyohara et al. ............... 219/137.71
4,000,374 12/1976 De Keyser .................... 219/137.71

*Primary Examiner*—Clifford C. Shaw
*Attorney, Agent, or Firm*—Bucknam & Archer

[57] ABSTRACT

The present invention relates to a method for measuring the free wire length in hot-arc or short-arc MIG/MAG welding by making use of the typical behavior of the current or the voltage in the bead short-circuit situation, in which the voltage rises in different ways depending on the free wire length. The phenomenon can be used for measuring the free wire length.

7 Claims, 4 Drawing Figures

METHOD FOR MEASURING THE FREE WIRE LENGTH IN MIG/MAG WELDING

BACKGROUND OF THE INVENTION

1. Field of the Invention

The present invention relates to a method for measuring the free wire length in short-arc MIG/MAG welding by making use of the typical behavior of the current and the voltage in the bead short-circuit situation.

2. Description of the Prior Art

It is previously known to use the information obtained regarding the voltage and current of the electric arc for measuring the position of the welding burner. German Patent Application DE-OS 2 611 377 discloses a method in which the height of the welding burner is measured and adjusted by measuring the welding current. In the method the total current is measured. The disadvantage of the method is the dependence of the current on the wire feeding speed.

U.S. Pat. No. 4,169,224 describes a method in which the electric arc is compared with an electric analog. For this reason the use of the apparatus is limited primarily to the hot-arc range.

In U.S. Pat. No. 4,302,655 the position of the welding burner is measured by turning the burner so as to be perpendicular to the run direction and by measuring the variation of the welding current.

It is essential for the success of MIG welding that the so-called free wire length ($l_0$) is of the desired magnitude. In manual welding the welder, on the basis of visual observation, makes sure that a suitable free wire length is maintained. In mechanized automatic welding the situation is different.

In automatic welding, the dimensional tolerances and unevenness of the pieces to be welded may produce a situation in which the current nozzle, guided in a predetermined manner, will not at all points remain at the correct distance from the workpiece.

SUMMARY OF THE INVENTION

The method according to the invention eliminates the disadvantages of the said known methods by continually measuring the free wire length and by directing the current nozzle accordingly. In the method use is made of the typical behavior of the current and the voltage in the bead short-circuit situation of MIG welding, by measuring the change of the voltage during the bead short-circuit, i.e. between time one ($t_1$), at which the voltage is at its minimum and the current begins to increase, and time two ($t_2$), at which both the voltage and the current are at maximum.

BRIEF DESCRIPTION OF THE DRAWINGS

In order that the invention may be readily carried into effect, it will now be described with reference to the accompanying drawings, wherein.

DESCRIPTION OF THE PREFERRED EMBODIMENTS

Figure 1:
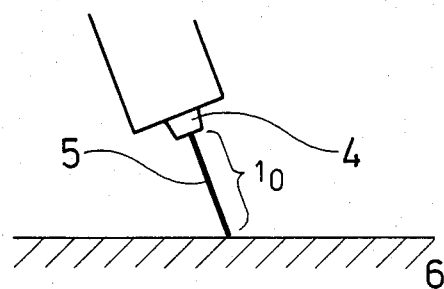
FIG. 1 illustrates welding apparatus in operation.

FIG. 1 depicts a current nozzle 4, a filler wire, 5, and a workpiece 6, as well as the free wire length $l_0$.

Figure 2A:
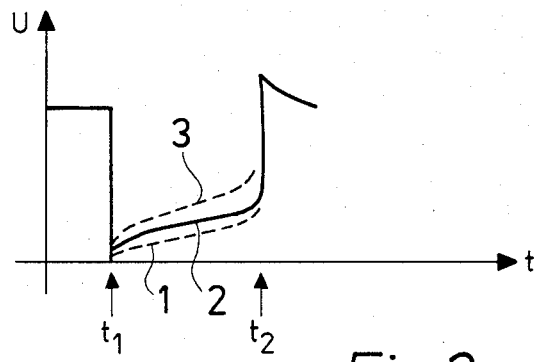
FIG. 2a illustrates the time dependence of voltage in the filler wire.
Figure 2B:
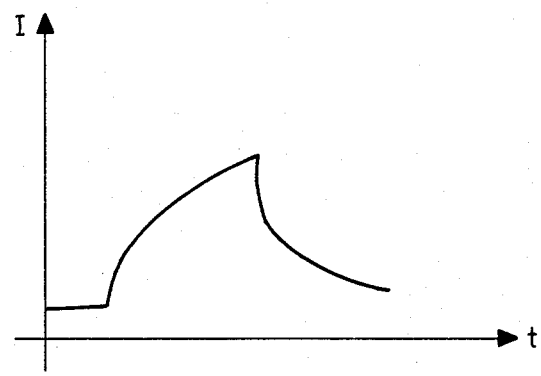
FIG. 2b illustrates the time dependence of current in the filler wire.

The behavior of the voltage within time interval $t_2 - t_1$ seems, according to observations, to be dependent on the free wire length $l_0$ in the manner depicted in FIG. 2A in such a way that curve 1 corresponds to a short free wire, curve 2 to a medium-length one, and curve 3 to a long one.

Figure 3:
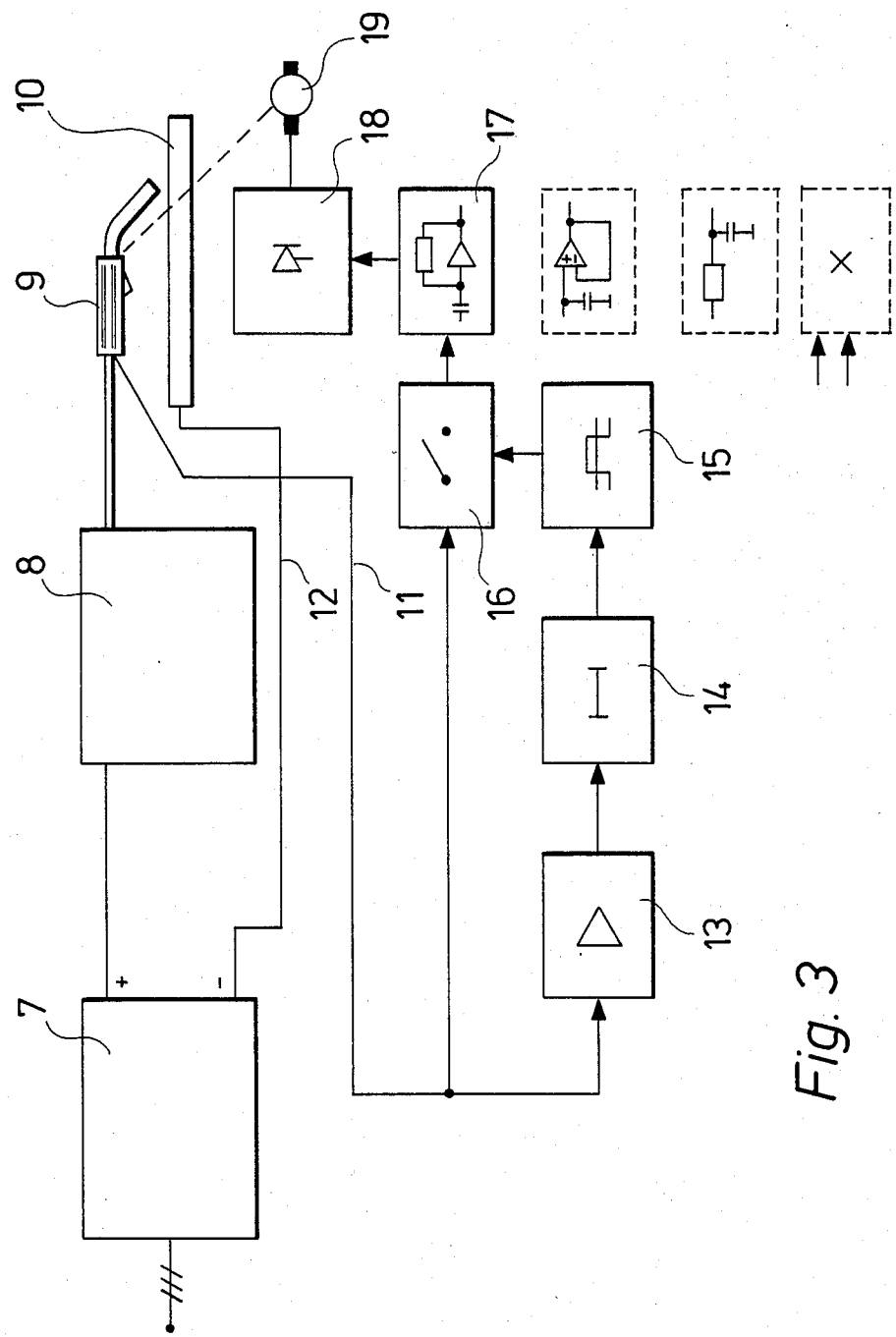
FIG. 3 is a block diagram of an embodiment of apparatus for carrying out the method of the invention.

FIG. 3 depicts one possible embodiment of the apparatus. The figure shows a power source 7, a wire-feeding device 8 and a welding pistol 9. In addition, it has means (11) for measuring the voltage, a comparator 13, delay means 14, monostable means 15, a sample-taking switch 16, a differentiator 17, and a servomotor 19 with servomotor control means 18. From the workpiece there is a return conductor 12 to the power source.

The wiring works as follows:

At the beginning of a bead short-circuit the voltage U drops almost to zero. At this time the comparator 13 starts and activates the delay means 14. After the desired delay the delay means trigger the monostable circuit 15, which closes the switch 16 for the desired period, during which the measuring is carried out. During this period the arc voltage signal travels to the differentiator 17, which produces a signal proportional to the speed of the voltage change during the bead short-circuit; the signal for its part is proportional to the quantity to be measured. The signal obtained from the differentiator 17 can in a known manner be used for the control of the servomotor, which moves the burner.

If the quantity being measured is the momentary value of the voltage, the differentiator is replaced by a holding circuit. If the quantity being measured is the average voltage, the differentiator is replaced by a low pass filter. If the quantity being measured is the power, the differentiator is replaced by a multiplication and holding circuit, etc. The said alternatives are indicated by dotted lines in FIG. 3.

The phenomenon has been observed to be so intense and regular that it can be used for the measuring of the free wire length.

In this case it is possible to measure the voltage by sample taking at a certain moment within time interval $t_2 - t_1$, or to measure the average voltage within the said time interval, or to measure the speed of the voltage increase within the said time interval.

Instead of the voltage it is possible to measure the power of the electricity fed into the apparatus (momentary power, mean power, or the speed of the power increase) within the said time interval $t_2 - t_1$.

I claim:

1. A method for automatically controlling the free wire length extending from the gun of welding apparatus during a welding process, such as hot-arc, short-arc and MIG/MAG welding, said method comprising detecting a first time instant when the voltage over the arc achieves a minimum, said minimum indicating the beginning of a bead short-circuit situation;

measuring the voltage at at least one selected time point in the interval between said first time instant and a second time instant when the voltage over the arc, subsequent to said minimum, achieves a maximum, said maximum indicating the end of the bead short-circuit situation;

producing an electrical quantity affected by said measured voltage, said electrical quantity being representative of said free wire length; and controlling the gun to maintain said free wire length substantially constant in response to said electrical quantity.

2. A method according to claim 1, wherein the welding is carried out primarily within the hot-arc range and the conditions are altered temporarily in such a way that welding takes place within the short-arc range for the duration of the measuring.

3. A method according to claim 1, further comprising measuring the mean voltage within the said time interval $(t_2-t_1)$ as a step in producing said electrical quantity.

4. A method according to claim 1, further comprising measuring the momentarily fed electric power of the electric arc at a certain time within the said time interval $(t_2-t_1)$ as a step in producing said electrical quantity.

5. A method according to claim 1, further comprising measuring the mean power fed into the apparatus within said time interval $(t_2-t_1)$ as a step in producing said electrical quantity.

6. A method for automatically controlling the free wire length extending from the gun of welding apparatus during a welding process, such as hot-arc, short-arc and MIG/MAG welding, said method comprising detecting a first time instant when the voltage over the arc achieves a minimum, said minimum indicating the beginning of a bead short-circuit situation;

measuring the speed of the voltage increase at at least one selected time point in the interval between said first time instant and a second time instant when the voltage over the arc, subsequent to said minimum, achieves a maximum, said maximum indicating the end of the bead short-circuit situation;

producing an electrical quantity affected by said measured speed of said voltage increase, said electrical quantity being representative of said free wire length; and controlling the gun to maintain said free wire length substantially constant in response to said electrical quantity.

7. A method for automatically controlling the free wire length extending from the gun of welding apparatus during a welding process, such as hot-arc, short-arc and MIG/MAG welding, said method comprising detecting a first time instant when the voltage over the arc achieves a minimum, said minimum indicating the beginning of a bead short-circuit situation;

measuring the speed of the power increase at at least one selected time point in the interval between said first time instant and a second time instant when the voltage over the arc, subsequent to said minimum, achieves a maximum, said maximum indicating the end of the bead short-circuit situation;

producing an electrical quantity affected by said measured speed of said power increase, said electrical quantity being representative of said free wire length; and controlling the gun to maintain said free wire length substantially constant in response to said electrical quantity.

* * * * *